United States Patent
Iwamoto et al.

(10) Patent No.: US 9,007,558 B2
(45) Date of Patent: Apr. 14, 2015

(54) LIQUID CRYSTAL DISPLAY

(75) Inventors: Yoshihisa Iwamoto, Tokyo (JP);
Kunihiko Katano, Tokyo (JP); Keisuke Kato, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 247 days.

(21) Appl. No.: 13/553,018

(22) Filed: Jul. 19, 2012

(65) Prior Publication Data
US 2013/0021569 A1    Jan. 24, 2013

(30) Foreign Application Priority Data
Jul. 22, 2011    (JP) ................................. 2011-160804

(51) Int. Cl.
| | | |
|---|---|---|
| *G02F 1/1339* | (2006.01) | |
| *G02F 1/139* | (2006.01) | |
| *G02F 1/1337* | (2006.01) | |
| G02F 1/1343 | (2006.01) | |
| G02F 1/137 | (2006.01) | |

(52) U.S. Cl.
CPC ........ *G02F 1/1393* (2013.01); *G02F 1/133784* (2013.01); *G02F 1/13394* (2013.01); *G02F 1/134336* (2013.01); *G02F 2001/133742* (2013.01); *G02F 2001/133746* (2013.01); *G02F 2001/13712* (2013.01); *G02F 2203/64* (2013.01)

(58) Field of Classification Search
USPC ......................................................... 349/155
See application file for complete search history.

(56) References Cited

U.S. PATENT DOCUMENTS

| | | | | |
|---|---|---|---|---|
| 6,115,098 | A * | 9/2000 | Kume et al. .................... | 349/156 |
| 8,416,287 | B2 | 4/2013 | Hiroya et al. | |
| 2005/0157227 | A1* | 7/2005 | Hashimoto .................... | 349/113 |
| 2006/0139542 | A1 | 6/2006 | Ando et al. | |
| 2006/0146232 | A1* | 7/2006 | Liao et al. ........................ | 349/86 |
| 2007/0146568 | A1 | 6/2007 | Yamazaki et al. | |

(Continued)

FOREIGN PATENT DOCUMENTS

| | | |
|---|---|---|
| EP | 2 233 969 A2 | 9/2010 |
| JP | 2006184335 A | 7/2006 |

(Continued)

OTHER PUBLICATIONS

Extended European Search Report (EESR) dated Oct. 16, 2012 (in English) issued in counterpart European Application No. 12005327.7.

Japanese Office Action dated Feb. 18, 2015 issued in counterpart Japanese Application No. 2011-160804.

*Primary Examiner* — Timothy L Rude
(74) *Attorney, Agent, or Firm* — Holtz, Holtz, Goodman & Chick PC

(57) ABSTRACT

To improve the display uniformity in a vertical alignment liquid crystal display. A liquid crystal display includes: first and second substrates; first and second electrodes provided the substrates, respectively; first and second vertical alignment films provided on the substrates respectively; a plurality of columnar spacers disposed at least in a region where the first and second electrodes are superimposed, and provided between the first and second substrates; and a liquid crystal layer provided between the first and second substrates. The first vertical alignment film is subject to an alignment treatment in one direction. The liquid crystal layer has a pretilt angle during non-application of voltage. Each columnar spacer has a profile, in a planar view, which is not orthogonal to and which is not parallel with an alignment direction of liquid crystal molecules at substantially center of the liquid crystal layer in a layer thickness direction.

4 Claims, 9 Drawing Sheets

(56) References Cited

U.S. PATENT DOCUMENTS

2008/0278643 A1 11/2008 Iwamoto
2009/0051864 A1* 2/2009 Yanagawa et al. ............ 349/143

FOREIGN PATENT DOCUMENTS

| JP | 2008-281752 A | 11/2008 |
| JP | 2009157118 A | 7/2009 |

* cited by examiner

LIQUID CRYSTAL DISPLAY

BACKGROUND OF THE INVENTION

1. Field of the Invention

The present invention relates to improvement technology for improving the display quality in a vertical alignment liquid crystal display.

2. Description of the Related Art

With a vertical alignment liquid crystal display (LCD) in which liquid crystal molecules in a liquid crystal layer disposed between upper and lower substrates are aligned substantially vertically relative to the respective substrates during non-application of voltage, transmittance of a dark state can be lowered extremely by adopting a normally black mode in which the respective polarizers disposed in a manner of sandwiching the upper and lower substrates are of a crossed Nicol arrangement. It is thereby possible to realize a liquid crystal display with a high contrast ratio and superior display quality. A conventional example of this kind of vertical alignment liquid crystal display is disclosed, for example, in Japanese Unexamined Patent Application Publication No. 2008-281752.

With the foregoing vertical alignment liquid crystal display, the alignment state of the liquid crystal layer is controlled by applying voltage to the liquid crystal layer by using a lower electrode provided to a lower substrate and an upper electrode provided to an upper substrate. As a method of applying voltage, for instance, the multiplex driving method (simple matrix driving method) is used. As the configuration of a display unit of the liquid crystal display, there are mainly the following two types; namely, a segment type in which electrodes of a shape corresponding to the display image are used, and a dot matrix type in which stripe-shaped electrodes provided respectively to the upper substrate and the lower substrate are arranged so that their respective extending directions intersect, and the areas where the electrodes overlap are respectively used as the pixel. In order to control the liquid crystal layer to be a mono-domain vertical alignment state having a pretilt angle that is slightly inclined relative to the respective substrates during non-application of voltage, a vertical alignment film is provided to the surface of the respective substrates, and the vertical alignment films are subject to an alignment treatment such as the rubbing process. The direction of the alignment treatment is configured, for example, as an anti-parallel state set to the vertical direction (12 o'clock direction, 6 o'clock direction) on the display surface of the liquid crystal display. As the liquid crystal material configuring the liquid crystal layer, a material in which the dielectric constant anisotropy is a negative value is used. When voltage is applied to the liquid crystal layer using the respective electrodes, the liquid crystal molecules are reoriented horizontally relative to the substrate surface along the alignment treatment direction in a large part of the region of the liquid crystal layer. Provided to the outside of the upper and lower substrates are an upper polarizer and a lower polarizer disposed so that their respective absorption axes are substantially orthogonal to each other. The absorption axis of each polarizer is disposed, for example, substantially 45° relative to the alignment treatment direction. A viewing angle compensator is provided between the respective substrates and the respective polarizers as needed. As the viewing angle compensator, used is a compensator having negative uniaxial optical anisotropy or negative biaxial optical anisotropy. When using a viewing angle compensator having negative biaxial optical anisotropy, preferably the in-plane slow axis thereof is substantially orthogonal to the absorption axis of the adjacent polarizer.

With the vertical alignment liquid crystal display described above, the optimal viewing direction with the most superior display quality can be set to the 6 o'clock direction of the display surface. Meanwhile, a direction where this optimal viewing direction is rotated 180° is an anti-viewing direction in which the portion, that is originally of a bright display state when observed at a slight angle from the polar direction based on the normal direction of the display surface, becomes extremely dark and the contrast drops. In the horizontal direction of the display surface, which is a direction that is orthogonal to the optimal viewing direction and the anti-viewing direction, relatively favorable viewing angle characteristics can be obtained. Thus, the liquid crystal display having the foregoing structure can be suitably used for various usages.

Meanwhile, in a conventional liquid crystal display, spherical spacers are distributed and disposed between the upper and lower substrates in order to even out the spacing (cell thickness) between the upper and lower substrates. The cell thickness of the liquid crystal display is defined according to the grain size of the foregoing spherical spacers. However, particularly with a vertical alignment liquid crystal display, regions of alignment non-uniformity tend to arise in the liquid crystal layer around the spherical spacers, and these regions cause a light leak during non-application of voltage and generate a dark region during application of voltage. In order to deal with this drawback, considered may be disposing columnar spacers formed from photosensitive resin between the upper and lower substrates in substitute for the spherical spacers. For example, in the case of a dot matrix-type display unit, by disposing the columnar spacers between the respective stripe-shaped electrodes of the upper and lower substrates, it is possible to improve the display uniformity as well as the cell thickness uniformity.

Nevertheless, even when the columnar spacers are introduced in the vertical alignment liquid crystal display as described above, a sandy texture may be visually recognized across the entire dot matrix-type display unit, for instance, when viewing the liquid crystal display from directions that are roughly 60° in the clockwise and counterclockwise directions, respectively, around the anti-viewing direction (12 o'clock direction). This state where the display non-uniformity is observed most notably near the edge of the pixels and near the edge of the columnar spacers. In addition, near the edge of the columnar spacers, there are cases where the display non-uniformity is also observed from directions other than the anti-viewing direction. Moreover, this kind of display non-uniformity tends to become more pronounced when the frame frequency is lowered in the multiplex driving method.

SUMMARY OF THE INVENTION

One object of a specific mode of the present invention is to improve the display uniformity in a vertical alignment liquid crystal display.

According to one aspect of the present invention, a liquid crystal display includes: (a) a first substrate and a second substrate placed opposite each other; (b) a first electrode provided on one side of the first substrate; (c) a second electrode provided on one side of the second substrate; (d) a first vertical alignment film provided on one side of the first substrate; (e) a second vertical alignment film provided on one side of the second substrate; (f) a plurality of columnar spacers disposed at least in a region where the first electrode and the second electrode are superimposed, and provided between the first substrate and the second substrate; and (g) a liquid crystal layer provided between the first substrate and the second substrate, (h) wherein the first vertical alignment film is subject to an alignment treatment in one direction, (i) wherein the liquid crystal layer has a pretilt angle during non-application of voltage, and (j) wherein each of the plurality of columnar spacers has a profile, in a planar view, which is not orthogonal to and which is not parallel with an alignment direction of liquid crystal molecules at substantially center of the liquid crystal layer in a layer thickness direction, (or which is not orthogonal to and which is not parallel with a direction of the alignment treatment).

According to the foregoing configuration, it is possible to reduce the variation in locations of dark line intersections which cause a visible sandy texture in the display unit when the columnar spacers are introduced in the vertical alignment liquid crystal display, and cause the intersection locations to become an orderly state. Accordingly, it is possible to improve the display uniformity in a vertical alignment liquid crystal display.

In the foregoing liquid crystal display, the profile of each of the plurality of columnar spacers is preferably formed of straight lines.

Moreover, the profile of each of the plurality of columnar spacers is preferably formed of lines including a broken curve or a curved line or a combination thereof. In this case, with respect to each of the plurality of columnar spacers, an overall extending direction is preferably substantially orthogonal to or substantially parallel with a direction of the alignment treatment.

In the foregoing liquid crystal display, each of the plurality of columnar spacers has, for instance, a cross section of a substantial trapezoidal shape.

DESCRIPTION OF THE PREFERRED EMBODIMENTS

Embodiments of the present invention are now explained with reference to the appended drawings. In the ensuing explanation, observations by the present inventors regarding the cause of the display non-uniformity when columnar spacers are, introduced in a vertical alignment liquid crystal display are foremost explained, and an embodiment of the present invention based on the discovery obtained from the foregoing observations is subsequently explained.

Figure 1:
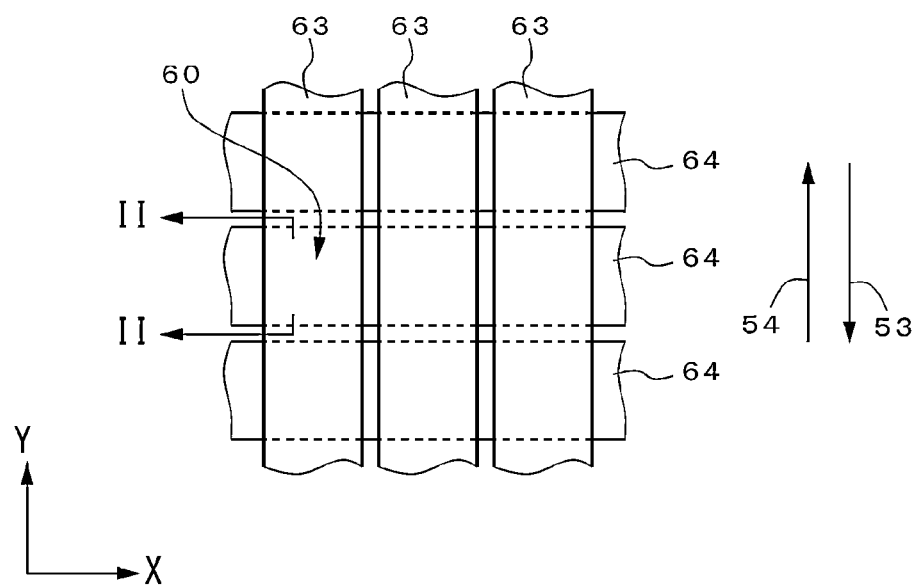
FIG. 1 is a schematic plan view showing an example of the matrix-type electrode structure.

FIG. 1 is a schematic plan view showing an example of the matrix-type electrode structure. As shown in FIG. 1, a matrix-type electrode structure is obtained by combining a plurality of stripe-shaped upper electrodes 63 extending in the illustrated Y direction, and a plurality of stripe-shaped lower electrodes 64 extending in the X direction which is orthogonal to the Y direction. The regions where the upper electrodes 63 and the lower electrodes 64 intersect respectively become a pixel part 60, and as a whole a plurality of pixel parts 60 arranged in a matrix are configured.

Figure 2:
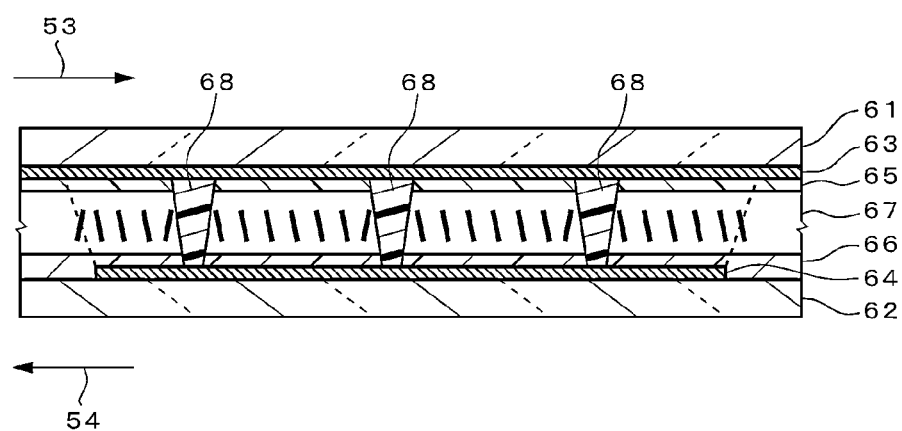
FIG. 2 is a partial cross section showing an example of the vertical alignment liquid crystal display which adopts the electrode structure illustrated in FIG. 1.

FIG. 2 is a partial cross section showing an example of the vertical alignment liquid crystal display which adopts the electrode structure illustrated in FIG. 1. The partial cross section shown in FIG. 2 corresponds to the cross section of line II-II (cross section of one pixel part) shown in FIG. 1. The liquid crystal display shown in FIG. 2 is configured by including an upper substrate (first substrate) 61 and a lower substrate (second substrate) 62, an upper electrode 63 and an alignment film 65 provided to one surface of the upper substrate 61, a lower electrode 64 and an alignment film 66 provided to one surface of the lower substrate 62, and a liquid crystal layer 67 and a columnar spacer 68 provided between the upper substrate 61 and the lower substrate 62.

Each columnar spacer 68 is of a tapered cross section shape (has a cross section of a substantial trapezoidal shape) which tapers from the upper electrode 63 toward the lower electrode 64 as shown in the diagram, and provided by extending in a direction that is substantially the same as the extending direction of the lower electrode 64. In this example, three columnar spacers 68 are disposed per pixel part 60 (refer to FIG. 1). These columnar spacers 68 are formed from photosensitive resin or the like, fastened to the upper electrode 63, and come into contact with the alignment film 64 on the lower substrate 62 side. Note that an insulating film may also be provided between the lower electrode 64 and the respective columnar spacers 68.

Each alignment film 65, 66 is a vertical alignment film for aligning the liquid crystal molecules of the liquid crystal layer 67 to be substantially vertical, and each alignment film is subject to an alignment treatment (rubbing process in this example). The direction (hereinafter referred to as the "rubbing direction") 53 of the rubbing process performed to the alignment film 65 and the rubbing direction 54 of the alignment film 66 are of mutually opposite directions (in an antiparallel state). As shown in FIG. 1, the rubbing direction 53 of the alignment film 65 and the rubbing direction 54 of the alignment film 66 are set to be substantially parallel with the extending direction of the upper electrode 63. In this example, the rubbing directions 53, 54 coincide with the vertical direction of the display unit of the liquid crystal display. As a result of the rubbing process being performed to the respective alignment films 65, 66, a pretilt angle is developed in the liquid crystal molecules of the liquid crystal layer 67. The liquid crystal layer 67 is formed by filling the liquid crystal material, which has negative dielectric anisotropy, between the upper substrate 61 and the lower substrate 62.

When voltage is applied between the upper electrode 63 and the lower electrode 64 in the liquid crystal display shown in FIG. 2, the liquid crystal molecules of the liquid crystal layer 67 become inclined along a direction that is prescribed by the respective rubbing directions 53, 54 throughout much of the region where both electrodes overlap vertically. Nevertheless, since a fringe electric field occurs between the upper and lower substrates as shown with the broken line in the diagram near the respective edges of the upper electrode 63 and the lower electrode 64, the long axis direction of each liquid crystal molecules near the edges is inclined with a tilt between a direction orthogonal to the fringe electric field and a horizontal direction. Thus, in the liquid crystal layer 67, regions where the liquid crystal molecules are aligned in a direction that is different from the alignment direction (easy axis) prescribed by the rubbing directions will appear. This kind of alignment direction of the liquid crystal molecules is shown as a rod shape inside the liquid crystal layer 67 in FIG. 2. As shown in the diagram, in regions that are not near the pixel edge and regions that are relatively separated from the columnar spacer 68, the liquid crystal molecules are uniformly aligned along the alignment direction that is prescribed according to the rubbing directions 53, 54. Nevertheless, in the regions near the pixel edge where the fringe electric field is generated, the liquid crystal molecules are aligned in the alignment direction prescribed by the fringe electric field when the alignment direction prescribed by the fringe electric field and the alignment direction prescribed by the rubbing directions 53, 54 are different. In addition, even around the columnar spacers 68, due to the influence of the tapered cross section shape, it is considered that the liquid crystal molecules will become aligned in a direction that is different from the alignment direction prescribed by the rubbing directions 53, 54.

Figure 3:
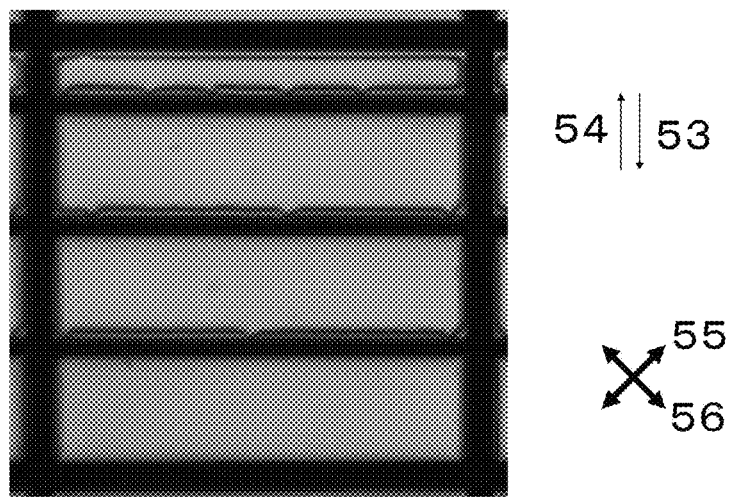
FIG. 3 is a diagram showing an alignment texture image of one pixel observed from a normal direction during application of voltage in the liquid crystal display illustrated in FIG. 2.
Figure 4:
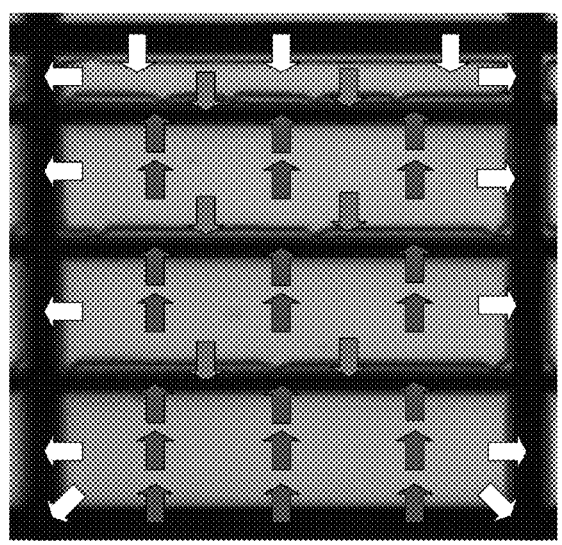
FIG. 4 is a diagram showing the alignment state using arrows by overlapping the alignment state with the alignment texture image of FIG. 3.

FIG. 3 is a diagram showing an alignment texture image of one pixel observed from a normal direction during application of voltage in the liquid crystal display illustrated in FIG. 2. The rubbing directions 53, 54 are as shown in the diagram, and the absorption axes 55, 56 of the respective polarizers are orthogonal to each other, and set to a direction which is substantially 45° relative to the respective rubbing directions 53, 54. As shown in the diagram, in one pixel a plurality of stripe-shaped columnar spacers are disposed parallel to the extending direction of the lower electrode. A dark region or a dark line is observed near the edge at the left and right sides and the upper side of one pixel. This dark region or dark line is a result of the director rotating near the pixel edge because the alignment direction prescribed by the fringe electric field and the alignment direction prescribed by the rubbing direction (easy axis) are different, and the alignment direction substantially coinciding with either of the absorption axes 55, 56 of the respective upper and lower polarizers. Specifically, it is considered that the alignment direction rotates 90° near the edge of the left and right sides, and the alignment direction rotates 180° near the edge of the upper side. Meanwhile, a dark line (dark region) is also observed even at the upper side of the respective columnar spacers shown in FIG. 3. This is a phenomenon that is observed because the alignment direction prescribed by the tapered cross section shape of the columnar spacer and the alignment direction prescribed by the rubbing direction (easy axis) differ by substantially 180', and it can be understood that the direction is also rotated 180° near this region. When these alignment states are overlapped with the alignment texture image of FIG. 3 and shown with arrows, the result will be as shown in FIG. 4. A dark line (dark region) is generated near the upper edge of the pixel part and near the upper edge of the columnar spacer, and, in certain parts, a portion where the upper edge of the pixel part and the upper edge of the columnar spacer intersect is observed. In addition, the intersections of the dark lines are generated randomly, and it has also been confirmed that such intersections are generated at different locations depending on the respective pixel parts.

Figure 5:
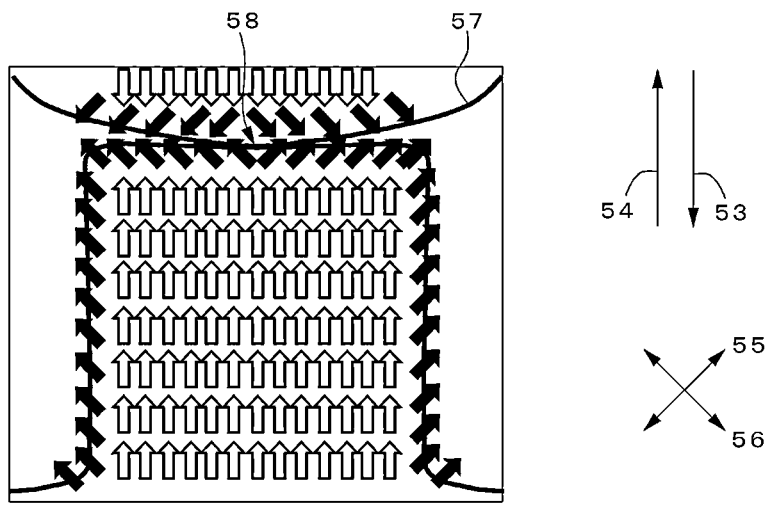
FIG. 5 is a conceptual diagram schematically showing the director distribution in one pixel during application of voltage in the liquid crystal display.

FIG. 5 is a conceptual diagram schematically showing the director distribution in one pixel during application of voltage in the foregoing liquid crystal display. The arrows in the diagram show the direction in which the liquid crystal molecules at the center in the thickness direction of the liquid crystal layer are inclined based on the side that is close to the lower substrate. As shown in FIG. 5, a point disclination where the liquid crystal molecules are vertical relative to the substrate even though voltage is being applied is formed at the foregoing intersections at the upper edge of the pixel part, and it is considered that the liquid crystal molecules are aligned radially around the point disclination. Thus, it is considered that, when the intersections are positioned randomly for each pixel part, the viewing angle characteristics particularly near the upper edge will change, and, when the observation angle is inclined relative to the polar direction from the normal direction of the liquid crystal display at roughly 60° in the clockwise and counterclockwise directions, respectively, around the anti-viewing direction, the appearance observation will be recognized as a display of sandy texture since the viewing angle characteristics are different for each pixel part, and the display non-uniformity becomes obvious. Accordingly, it is anticipated that the display non-uniformity can be resolved by fixing the foregoing intersections at basically the same position in all pixel parts based on some kind of method. It is considered that the same also applies near the upper edge of the columnar spacers where the director rotates 180°. Note that the columnar spacer is provided to the upper electrode in the foregoing explanation, but when the columnar spacer is formed on the lower electrode, the tapered cross section shape becomes a reverse taper and, therefore, the locations of the dark lines caused by the columnar spacers in the pixel part tend to shift toward the lower edge side of the columnar spacers.

The liquid crystal display of an embodiment of the present invention that was created based on the foregoing discovery is now explained in detail.

Figure 6:
FIG. 6 is a plan view schematically showing the liquid crystal display according to an embodiment of the present invention.

FIG. 6 is a plan view (front view) schematically showing the liquid crystal display according to an embodiment of the present invention. The liquid crystal display of this embodiment shown in FIG. 6 is a vertical alignment liquid crystal display in which the liquid crystal molecules in the liquid crystal layer disposed between upper and lower substrates are aligned substantially vertically relative to the respective substrates during non-application of voltage, and adopts a normally black mode in which the respective polarizers disposed in a manner of sandwiching the upper and lower substrates are of a crossed Nicol arrangement. The liquid crystal display of this embodiment comprises a matrix-type display unit and a segment-type display unit in the display area as shown in the diagram. This liquid crystal display can be used, for example, as an in-car information display unit.

Figure 7A:
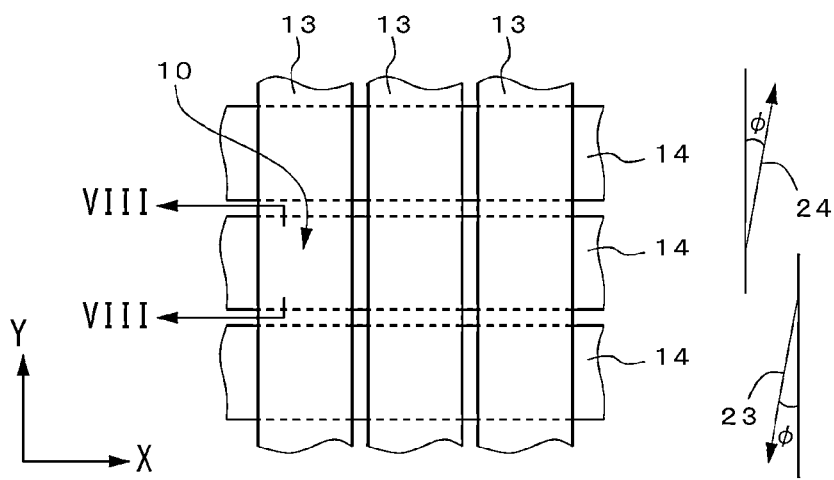
FIGS. 7A and 7B are schematic plan views showing an example of the electrode structure of the matrix-type display unit in the liquid crystal display of this embodiment illustrated in FIG. 6.
Figure 7B:
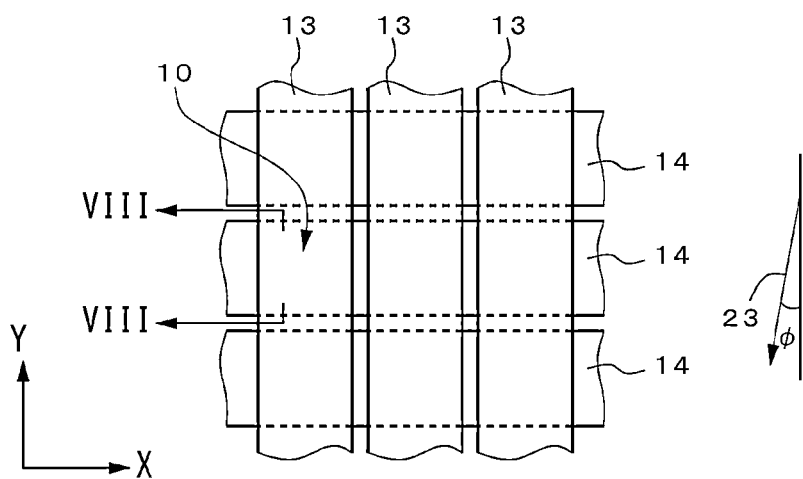

FIGS. 7A and 7B are schematic plan views showing an example of the electrode structure of the matrix-type display unit in the liquid crystal display of this embodiment illustrated in FIG. 6. As shown in FIG. 7A or FIG. 7B, a matrix-type electrode structure is obtained by combining a plurality of stripe-shaped upper electrodes (first electrodes) 13 extending in the illustrated Y direction, and a plurality of stripe-shaped lower electrodes (second electrodes) 14 extending in the X direction which is orthogonal to the Y direction. The regions where the upper electrodes 13 and the lower electrodes 14 intersect respectively become a pixel part 10, and as a whole a plurality of pixel parts 10 arranged in a matrix are configured.

Figure 8:
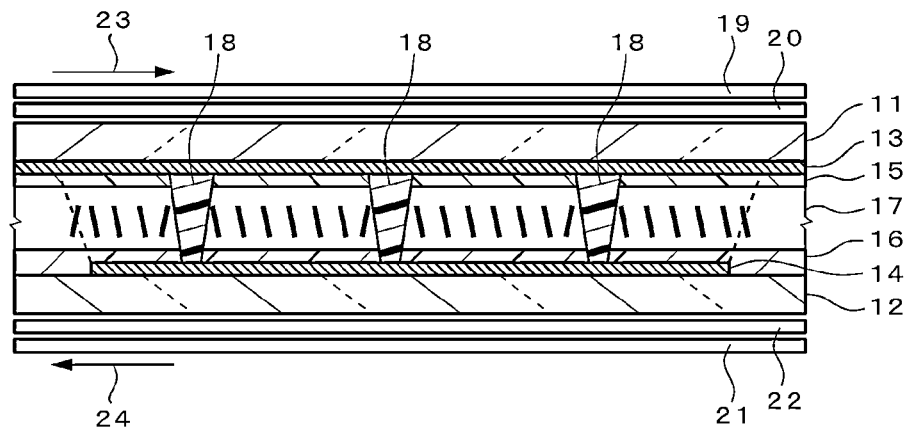
FIG. 8 is a partial cross section showing the cross section corresponding to line VIII-VIII of the liquid crystal display illustrated in FIG. 7.

FIG. 8 is a partial cross section showing the cross section corresponding to line VIII-VIII of the liquid crystal display illustrated in FIG. 7. As shown in FIG. 8, the liquid crystal display 1 of this embodiment comprises, as its basic configuration, an upper substrate (first substrate) 11 and a lower substrate (second substrate) 12 placed opposite each other, and a liquid crystal layer 17 disposed between both substrates. Note that members such as a seal material for sealing the periphery of the liquid crystal layer 17 are not illustrated and the explanation thereof is omitted.

The upper substrate 11 is, for example, a transparent substrate such as a glass substrate or a plastic substrate. As with the upper substrate 11, the lower substrate 12 is also, for example, a transparent substrate such as a glass substrate or a plastic substrate. As shown in the diagram, the upper substrate 11 and the lower substrate 12 are affixed to each other with a predetermined gap (for instance, roughly 3 μm) therebetween in a manner such that the upper electrode 13 and the lower electrode 14 provided to the respective substrates face each other.

The upper electrode 13 is provided to one side of the upper substrate 11. Similarly, the lower electrode 14 is provided to one side of the lower substrate 12. The upper electrode 13 and the lower electrode 14 are respectively configured by arbitrarily patterning a transparent conductive film made of, for instance, indium tin oxide (ITO) or the like. In the regions where the upper electrode 13 and the lower electrode 14 overlap, the segment display unit and the matrix display unit shown in FIG. 6 are formed.

The alignment film 15 is provided to one side of the upper substrate 11 so as to cover the upper electrode 13. Similarly, the alignment film 16 is provided to one side of the lower substrate 12 so as to cover the lower electrode 14. The alignment films 15, 16 are used for restricting the alignment state of the liquid crystal layer 17. In this embodiment, vertical alignment films are used as the alignment films 15, 16.

The liquid crystal layer 17 is provided between the upper electrode 13 of the upper substrate 11 and the lower electrode 14 of the lower substrate 12. In this embodiment, the liquid crystal layer 17 is configured from a liquid crystal material in which the dielectric constant anisotropy $\Delta\epsilon$ is negative. The bold lines illustrated in the liquid crystal layer 17 schematically show the alignment direction of the liquid crystal molecules in the liquid crystal layer 17. The liquid crystal layer 17 of this embodiment is set to a vertical alignment mode in which the alignment direction of the liquid crystal molecules during non-application of voltage is substantially vertical relative to the respective substrate surfaces of the upper substrate 11 and the lower substrate 12.

Figure 9:
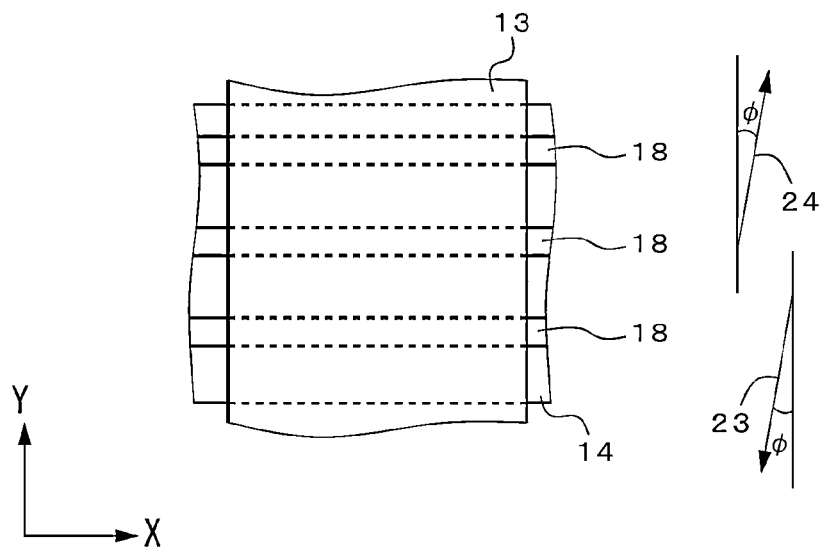
FIG. 9 is a schematic plan view of columnar spacers.

The columnar spacers 18 are formed using transparent resin or resin of an intended color (black resin, color transparent resin, or the like), and, as shown in FIG. 8, are formed in a tapered cross section shape (has a cross section of a substantial trapezoidal shape) which tapers form the upper electrode 13 toward the lower electrode 14. The schematic plan view of the columnar spacers 18 is shown in FIG. 9. FIG. 9 shows the structure of one pixel of the matrix-type display unit. As shown in the diagram, the region where the upper electrode 13 and the lower electrode 14 overlap corresponds to one pixel part, and a plurality of (three in the illustrated example) columnar spacers 18 are disposed per pixel part. Each columnar spacer 18 is provided in a stripe shape extending in a direction that is substantially the same as the extending direction (X direction) of the lower electrode 14. To put it differently, each columnar spacer 18 has a profile (outer edge shape) formed from a straight line in a planar view, and this straight line is disposed so as to become substantially parallel with the X direction. Each columnar spacer 18 is fastened to the upper electrode 13, and comes into contact with the alignment film 16 on the lower substrate 12 side. Note that an insulating film may also be provided between the upper electrode 13 and the respective columnar spacers 18.

An upper polarizer 19 is disposed on the outside of the upper substrate 11. Similarly, a lower polarizer 21 is disposed on the outside of the lower substrate 12. The upper polarizer 19 and the lower polarizer 21 are disposed so that their respective absorption axes are substantially orthogonal to each other. Moreover, each absorption axis of the upper polarizer 19 and the lower polarizer 21 is set to a position which forms an angle of substantially 45' relative to the alignment direction of the liquid crystal molecules (hereinafter referred to as the "liquid crystal layer central molecules") at substantially the center of the liquid crystal layer 17 in the layer thickness direction which is defined in correspondence with the direction of the alignment treatment. Note that an optical compensator such as a C plate may be disposed between the respective polarizers and the respective substrates as needed. For example, in this embodiment, optical compensators 20, 22 are respectively disposed between the upper substrate 11 and the upper polarizer 19, and between the lower substrate 12 and the lower polarizer 22.

The direction of the alignment treatment performed to the respective alignment films 15, 16 is now explained in detail with reference to FIG. 7 once again. The alignment film 15 and the alignment film 16 are disposed after being subject to uniaxial alignment treatment in which the direction of the alignment treatment performed to the respective alignment films 15, 16 become an anti-parallel alignment. Here, as shown in FIG. 7A, the directions 23, 24 of the alignment treatment performed to the respective alignment films 15, 16 are set to form an angle φ that is greater than 0° but smaller than 90° based on the extending direction (Y direction) of the upper electrode 13. Moreover, the direction 23 of the alignment treatment performed to the alignment film 15 and the direction 24 of the alignment treatment performed to the alignment film 16 are set to be mutually parallel. As the alignment films 15, 16, for instance, films capable of creating a pretilt angle of approximately 89° relative to the liquid crystal layer 17 are used. As the alignment treatment, for example, the publicly known rubbing process, photo alignment treatment or/hu like may be used. Note that it is also possible to perform the alignment treatment to only one of either the alignment film 15 or the alignment film 16. For example, when the alignment treatment is only performed to the alignment film 15, as shown in FIG. 7B, the direction of the alignment treatment may be set to form the angle φ relative to the extending direction of the upper electrode 13. Moreover, in the example shown in FIG. 7, while the angle φ is prescribed based on the extending direction of the upper electrode 13, the angle φ may also be prescribed based on the extending direction (X direction) of the lower electrode 14. As a result of prescribing the direction of the alignment treatment as described above, it is possible to cause the alignment direction of the liquid crystal layer central molecules, which is defined in correspondence with the direction of the alignment treatment, to be in a state which is not orthogonal to and which is not parallel with the extending direction of either the upper electrode 13 or the lower electrode 14, and to be in a state which is not orthogonal to and which is not parallel with the straight line forming the profile of the columnar spacer 18 in a planar view (refer to FIG. 9).

Embodiments of the liquid crystal display according to the present invention are now explained.

Foremost, an upper substrate including an upper electrode and a lower substrate including a lower electrode were respectively prepared. Specifically, prepared was a pair of glass substrates in which one surface was subject to polishing treatment, a $SiO_2$ undercoat was formed on that surface, and a transparent electrode made of ITO (indium tin oxide) was deposited thereon. The photolithography process and etching process were performed to the transparent electrodes of these glass substrates for patterning the transparent electrodes into an intended shape. Note that, while omitted in this embodiment, an insulating layer made from $SiO_2$ or the like may also be formed on a part of the surface of the patterned transparent electrode as needed.

Subsequently, columnar spacers were formed by performing the photolithography process to the upper substrate side or the lower substrate side by using photosensitive resin. To explain the shape of the columnar spacers in further detail, the columnar spacers have a trapezoidal cross section shape, the upper side length is approximately 7 μm, the lower side length is approximately 28 μm, and the height is approximately 2.3 μm. Consequently, the inclination angle of the side of the columnar spacer is calculated to be approximately 12.4°.

Subsequently, the substrate formed with the columnar spacers and the other substrate were washed with an alkali solution or the like, a vertical alignment film was applied to the respective substrates via the flexographic printing method, and the substrates were calcined for 30 minutes at 180° C. in a clean oven.

After the calcination of the vertical alignment film, a cotton rubbing cloth was used to perform the rubbing process to the respective substrates in one direction on the substrate surface. Here, the angle of the direction (rubbing direction) of the alignment treatment shown in FIG. 7 was set differently at 5° intervals within the range of −15° to +15°.

In addition, a thermoset seal material, in which a silica spacer having a grain size of approximately 2 μm was mixed therein, was applied to the lower substrate in an intended pattern using a dispenser. Subsequently, the upper substrate and the lower substrate were affixed to each other so that the electrode surfaces of the respective substrates face each other, and the direction (rubbing direction) of the alignment treatment shown in FIG. 7 becomes anti-parallel, and the seal material was hardened via thermal compression bonding. Consequently, a plurality of types of empty cells having different settings of the angle φ of the rubbing direction were completed.

Subsequently, a liquid crystal material in which Δn is approximately 0.1566 and Δ∈ is a negative value was injected in the foregoing empty cells via the vacuum injection method, pressing was thereafter performed to obtain a uniform cell thickness and seal the inlet, and the product was annealed for one hour at 120° C.

Subsequently, polarizers were respectively affixed to the front face side (outside of the upper substrate) and the rear face side (outside of the lower substrate) of the cells. The respective polarizers were disposed so that their mutual absorption axes are of a crossed Nicol arrangement, and so that their respective absorption axes become substantially 45° relative to the alignment direction of the liquid crystal layer central molecules defined by the rubbing process. Moreover, a viewing angle compensator was disposed between the respective polarizers and the respective glass substrates as needed.

Finally, the liquid crystal material was filled, and a lead frame was mounted on the electrode extracting terminal of the liquid crystal cells to which the polarizers were affixed to complete the liquid crystal display. Note that the pretilt angle in the liquid crystal layer was set to be substantially 89.8° to 89°. Moreover, actual measured value of the cell thickness was approximately 1.8 μm, and the retardation of the liquid crystal layer was substantially 280 nm.

Figure 10:
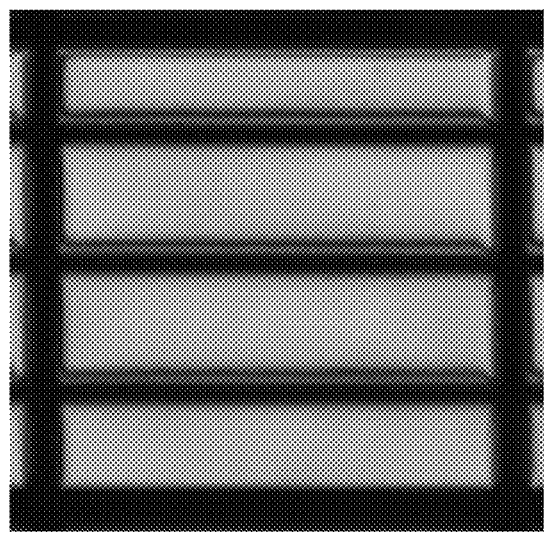
FIG. 10 is a diagram showing an observation image of the alignment texture of one pixel during application of voltage in the liquid crystal display of an example where the pretilt angle is set to approximately 89°, and the angle of the alignment treatment direction (rubbing direction) is set to −10°.

FIG. 10 is a diagram showing an observation image of the alignment texture of one pixel during application of voltage in the liquid crystal display of an example where the pretilt angle is set to approximately 89°, and the angle of the alignment treatment direction (rubbing direction) is set to −10°. Note that the observation of the alignment texture was conducted under room temperature, and the driving conditions were set to ¼ duty, ⅓ bias, frame reversed waveform, applied voltage of 7V, and frame frequency of 200 Hz. In the alignment texture shown in FIG. 10, only one intersection of dark lines at the upper edge of the pixel and the upper edge of the columnar spacer occurred near the right edge of the pixel, and it was confirmed that the location thereof is regular and fixed. Incidentally, it was confirmed that an equivalent alignment texture is also obtained in the other respective pixels not shown. As a result of the appearance observation, the non-uniformity upon viewing from the anti-viewing direction and the viewing direction was resolved, and a uniform display was realized from all directions. This effect was the same even when the angle φ of the alignment treatment was set to ±5°, ±15'. Moreover, it was confirmed that the effect becomes more notable as the pretilt angle approaches 90°. The effect of the foregoing phenomenon is exhibited so as long as the angle φ of the alignment treatment is greater than 0° and less than 90°, and the effect is even higher when φ is within the range of ±5° to ±15'.

Note that, while the alignment treatment was performed to both the upper substrate and the lower substrate and the direction of the alignment treatment was an anti-parallel arrangement in the foregoing explanation, similar effects can be expected even when the alignment treatment is performed to only one of the substrates. Moreover, even in cases where the respective substrates are subject the alignment treatment so as to develop a twisted alignment state in the liquid crystal layer between the upper substrate and the lower substrate, it is still possible to realize similar effects if the alignment direction of the liquid crystal layer central molecules is not orthogonal to and is not parallel with the extending direction of either the upper electrode 13 or the lower electrode 14. In addition, similar results can also be obtained even when a chiral material is added to the liquid crystal material.

Several embodiments that are different from the foregoing embodiment are now explained.

Figure 11:
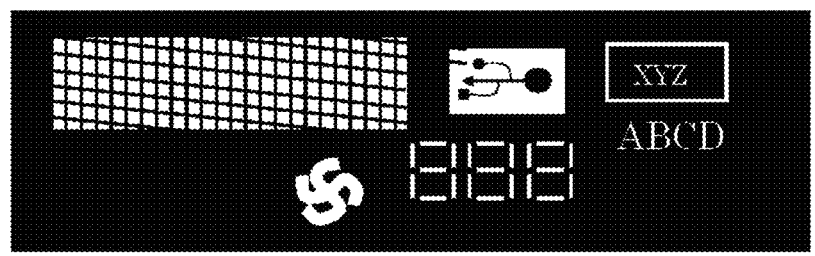
FIG. 11 is a plan view schematically showing the liquid crystal display of another embodiment according to the present invention.
Figure 12:
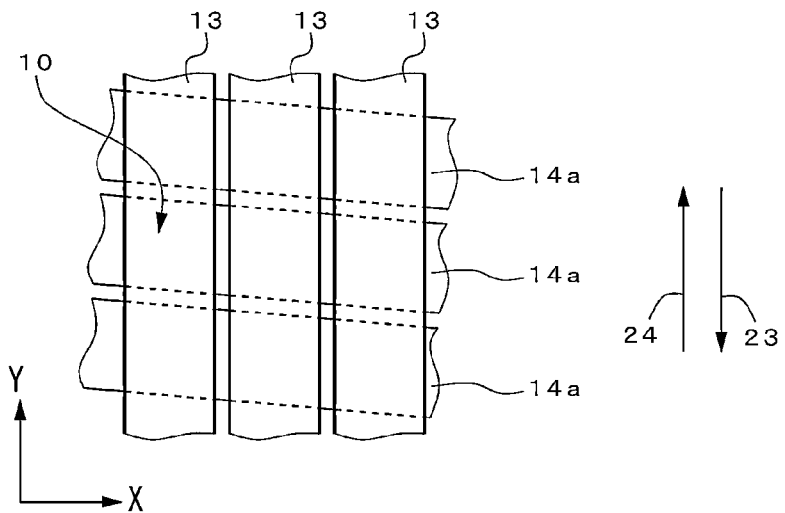
FIG. 12 is a schematic plan view of the structure of the matrix-type display unit in the liquid crystal display of the embodiment illustrated in FIG. 11.
Figure 13:
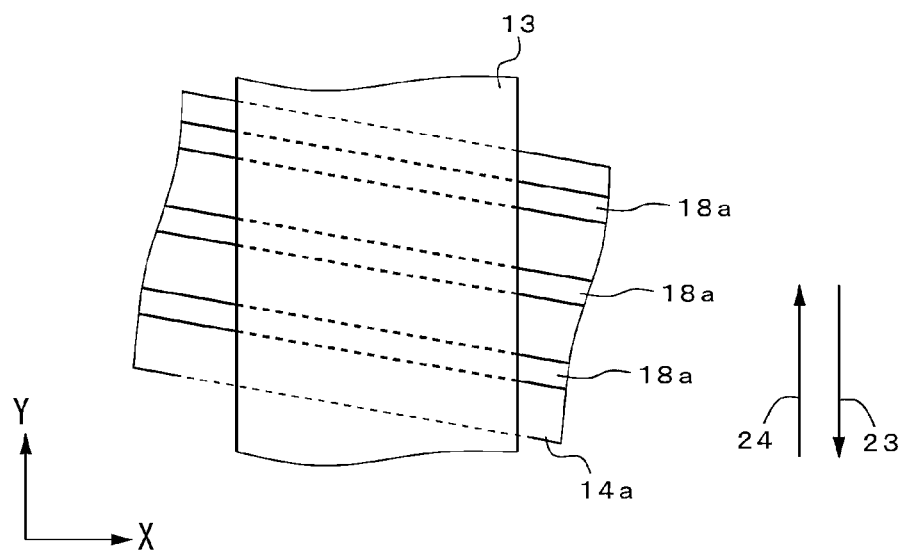
FIG. 13 is a plan view showing a configuration example of the columnar spacers in the electrode structure illustrated in FIG. 12.

FIG. 11 is a plan view schematically showing the liquid crystal display of another embodiment according to the present invention. The liquid crystal display of the embodiment shown in FIG. 11 differs from the embodiment shown in FIG. 6 with respect to the point that the pixel array of the matrix-type display unit is slightly tilted rather than being parallel to the horizontal direction of the liquid crystal display. The schematic plan view of the structure of the matrix-type display unit in the liquid crystal display of this embodiment is shown in FIG. 12. As shown in FIG. 12, a matrix-type electrode structure is configured by combining a plurality of stripe-shaped upper electrodes 13 extending in the illustrated Y direction, and a plurality of stripe-shaped lower electrodes 14a which are slightly tilted (for instance, tilted at an angle of roughly 10°) relative to the X direction (horizontal direction of the liquid crystal display). The regions where the upper electrodes 13 and the lower electrodes 14a intersect respectively become a pixel part 10, and as a whole a plurality of pixel parts 10 arranged in a matrix are configured. A plan view of the configuration example of the columnar spacers in the electrode structure illustrated in FIG. 12 is shown in FIG. 13. In the example shown in FIG. 13, a plurality of stripe-shaped columnar spacers 18a are disposed to be substantially parallel to the extending direction of the lower electrode 14a. Moreover, as shown in FIG. 12 and FIG. 13, the directions 23, 24 of the alignment treatment are substantially parallel to the Y direction. Consequently, since the alignment direction of the liquid crystal layer central molecules will be the 6 o'clock or 12 o'clock direction, it is possible to cause the alignment direction of the liquid crystal layer central molecules to be in a state which is not orthogonal to and which is not parallel with the extending direction of either the upper electrode 13 or the lower electrode 14a, and to be in a state which is not orthogonal to and which is not parallel with the straight line forming the profile of the columnar spacer 18a in a planar view. It is thereby possible to resolve the display non-uniformity of the liquid crystal display.

Figure 14A:
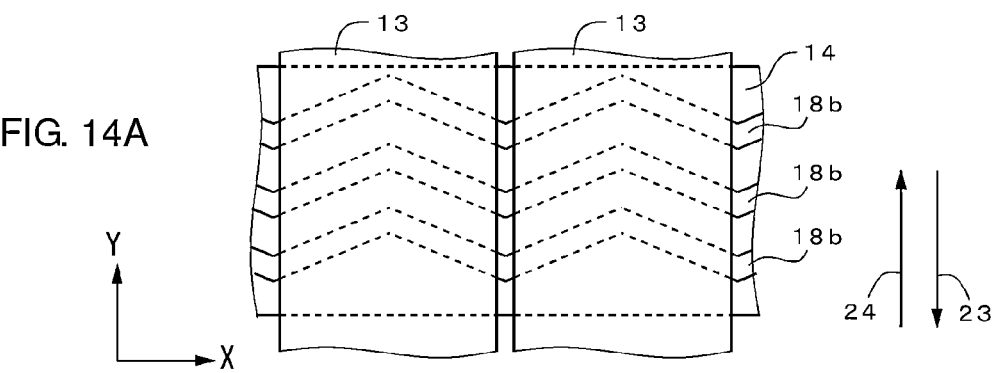
FIGS. 14A to 14C are schematic plan views showing the structures of the matrix-type display units in the liquid crystal display of still another embodiment according to the present invention.
Figure 14B:
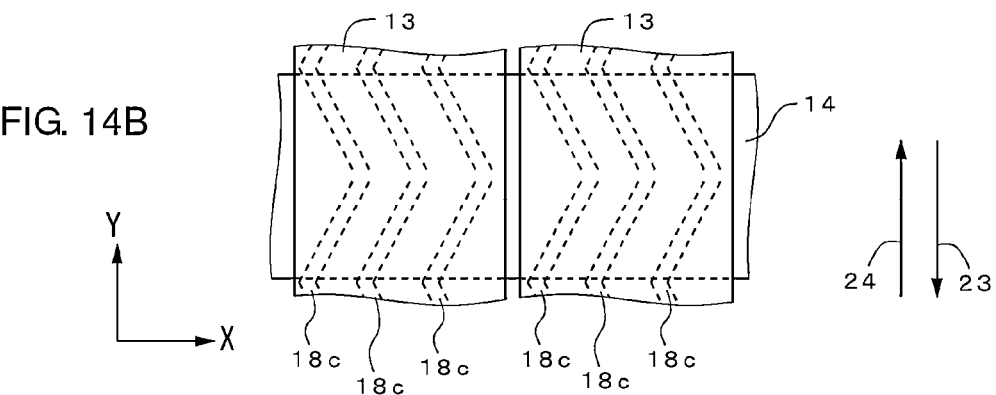
Figure 14C:
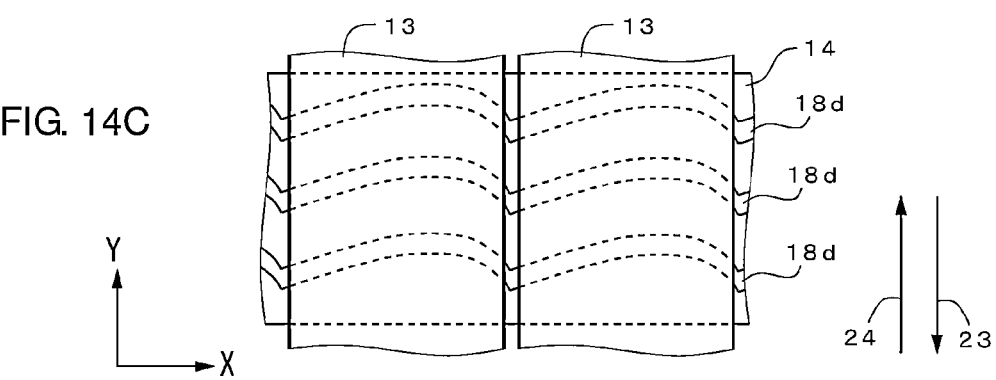

FIGS. 14A to 14C are schematic plan views showing the structures of the matrix-type display units in the liquid crystal display of still another embodiment according to the present invention. As illustrated in the respective diagrams of FIG. 14A to FIG. 14C, the shape of the columnar spacers in a planar view may be a shape that is other than a stripe shape. Specifically, in all of the structural examples shown in the respective diagrams of FIG. 14A to FIG. 14C, the plurality of upper electrodes 13 are formed in a stripe shape along the Y direction, and the plurality of lower electrodes 14 are formed in a stripe shape along the X direction. In addition, in the structural example shown in FIG. 14A, the respective columnar spacers 18b extend in the X direction (horizontal direction of the liquid crystal display) on the whole but repeat zigzag locally, and the extending direction of the spacers 18b changes periodically. Similarly, in the structural example shown in FIG. 14B, the respective columnar spacers 18c extend in the Y direction (vertical direction of the liquid crystal display) on the whole but repeat zigzag locally, and the extending direction of the spacers 18c changes periodically. Moreover, in the structural example shown in FIG. 14C, the respective columnar spacers 18d extend in the X direction (horizontal direction of the liquid crystal display) on the whole but are formed in an arced curved line shape locally, and the curved line shape is periodically repeated along the extending direction of the spacers 18d. Meanwhile, as shown in the respective diagrams of FIG. 14A to FIG. 14C, the directions 23, 24 of the alignment treatment are substantially parallel to the Y direction. Consequently, since the alignment direction of the liquid crystal layer central molecules will be the 6 o'clock or 12 o'clock direction, it is possible to cause the alignment direction of the liquid crystal layer central molecules to be in a state which is not orthogonal to and which is not parallel with the extending direction of either the upper electrode 13 or the lower electrode 14, and to be in a state which is not orthogonal to and which is not parallel with the straight line forming the profile of the columnar spacer 18 in a planar view. It is thereby possible to resolve the display non-uniformity of the liquid crystal display.

Figure 15:
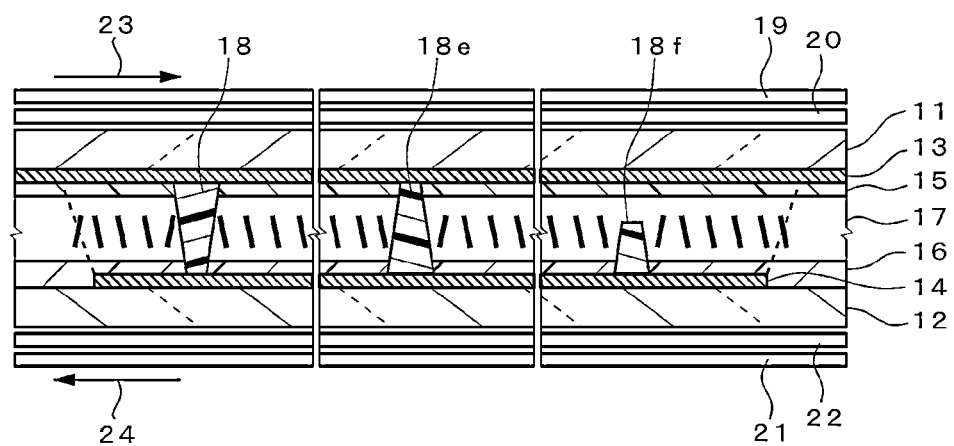
FIG. 15 is a partial cross section showing the cross section of one pixel of the liquid crystal display of yet another embodiment according to the present invention.

FIG. 15 is a partial cross section showing the cross section of one pixel of the liquid crystal display of yet another embodiment according to the present invention. Note that the same reference numeral is given to a constituent element which is common with the foregoing embodiments, and the detailed explanation thereof is omitted. While the columnar spacer 18 in the foregoing embodiments was structured to be fastened to one of either the upper substrate or the lower substrate, the configuration is not limited thereto, and the columnar spacer 18 may be fastened to different substrates depending on the display area of the liquid crystal display. For example, with the liquid crystal display shown in FIG. 15, the columnar spacer 18 disposed in the display area shown on the left side across the break line and the columnar spacer 18e disposed in the display area shown in the center are fastened to different substrates, respectively. It is thereby possible to control the tapered cross section shape of the columnar spacers reciprocally. Moreover, as illustrated in FIG. 15, if the resin spacer 18e fastened to one substrate is in contact with the alignment film of the other substrate, the same effect can be obtained even if the resin spacer 18f fastened to the other substrate is not in contact with the alignment film of one substrate. However, the height of the resin spacer 18f that is not in contact with the alignment film of one substrate is preferably a height that is ½ or more of the layer thickness (cell thickness) of the liquid crystal layer 17. A spacer such as the resin spacer 18f shown in FIG. 15 which is not in contact with one substrate may occur in any one of the foregoing embodiments. For example, while pressing was preformed to obtain a uniform cell thickness in the foregoing manufacturing process, pressing does not necessarily have to be performed. In the foregoing case, several of the spacers will not be in contact with one substrate. In this embodiment, such a spacer that is not in contact with one substrate is tolerated.

According to the liquid crystal display of the respective embodiments and examples described above, it is possible to control the locations of intersections of dark lines to be at regular positions. It is thereby possible to avoid the phenomenon where a sandy texture is visually recognized in the display unit, and thereby improve the display uniformity. Moreover, in comparison to the conventional technology which causes the direction of the alignment treatment to be parallel with the extending direction of the upper electrode or the lower electrode, it is possible to inhibit the frame frequency in which the dark line (dark region) occurs to be a lower value. Since the frame frequency in which the alignment non-uniformity occurs can be reduced, it is possible to inhibit cross talk and realize a favorable display quality, and additionally realize the cost reduction of the drive circuit.

Note that the present invention is not limited to the subject matter of the embodiments described above, and may be variously modified and implemented to the extent without departing from the spirit and the scope of the invention.

What is claimed is:

1. A liquid crystal display, comprising:
a first substrate and a second substrate placed opposite each other;
a first electrode provided on one side of the first substrate;
a second electrode provided on one side of the second substrate;
a first vertical alignment film provided on the one side of the first substrate;
a second vertical alignment film provided on the one side of the second substrate;
a plurality of columnar spacers disposed at least in a region where the first electrode and the second electrode are superimposed, the plurality of columnar spacers being provided between the first electrode and the second electrode; and
a liquid crystal layer provided between the first substrate and the second substrate,
wherein the first vertical alignment film is subject to an alignment treatment in one direction,
wherein the liquid crystal layer has a pretilt angle during non-application of voltage, and
wherein each of the plurality of columnar spacers has a profile, in a planar view, which is not orthogonal to and which is not parallel with an alignment direction of liquid crystal molecules at substantially a center of the liquid crystal layer in a layer thickness direction, or has a profile, in a planar view, which is not orthogonal to and which is not parallel with a direction of the alignment treatment.

2. The liquid crystal display according to claim 1, wherein the profile of each of the plurality of columnar spacers is formed of straight lines.

3. The liquid crystal display according to claim 1, wherein the profile of each of the plurality of columnar spacers is formed of lines including a broken curve or a curved line or a combination thereof.

4. The liquid crystal display according to claim 3, wherein, with respect to each of the plurality of columnar spacers, an overall extending direction is substantially orthogonal to or substantially parallel with a direction of the alignment treatment.

* * * * *